(12) United States Patent
Ichihara et al.

(10) Patent No.: US 11,551,637 B2
(45) Date of Patent: Jan. 10, 2023

(54) ELECTRONIC DEVICE AND CONTROL METHOD THEREOF

(71) Applicant: CANON KABUSHIKI KAISHA, Tokyo (JP)

(72) Inventors: Atsushi Ichihara, Kanagawa (JP); Tomoyuki Shiozaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 17/152,381

(22) Filed: Jan. 19, 2021

(65) Prior Publication Data

US 2021/0225322 A1    Jul. 22, 2021

(30) Foreign Application Priority Data

Jan. 22, 2020 (JP) .............................. JP2020-008597

(51) Int. Cl.
    *G09G 5/02* (2006.01)
    *G06F 3/14* (2006.01)
    *G09G 5/10* (2006.01)

(52) U.S. Cl.
    CPC ............. *G09G 5/02* (2013.01); *G06F 3/1423* (2013.01); *G09G 5/10* (2013.01); *G09G 2320/0626* (2013.01); *G09G 2320/0666* (2013.01); *G09G 2360/04* (2013.01)

(58) Field of Classification Search
    None
    See application file for complete search history.

(56) References Cited

U.S. PATENT DOCUMENTS

| 2003/0091229 A1* | 5/2003 | Edge | G09G 5/02 |
| | | | 348/E9.054 |
| 2010/0103322 A1* | 4/2010 | Bourgoin | H04N 9/69 |
| | | | 348/675 |
| 2015/0070539 A1* | 3/2015 | Kawai | G03B 17/18 |
| | | | 348/280 |

FOREIGN PATENT DOCUMENTS

| CN | 106710571 B | * | 5/2021 | .............. G09G 5/10 |
| JP | 04-166988 A | | 6/1992 | |
| JP | 2011112781 A | * | 6/2011 | .............. G09G 5/10 |

* cited by examiner

*Primary Examiner* — Yi Wang
(74) *Attorney, Agent, or Firm* — Cowan, Liebowitz & Latman, P.C.

(57) ABSTRACT

An electronic device comprises a plurality of display devices, a designation unit that designates one of a plurality of predetermined color balances for which adjustment values of the plurality of display devices are set in advance, and an adjustment unit that adjusts color balances of the plurality of display devices. The adjustment unit performs a first adjustment for adjusting the color balances of the plurality of display devices using adjustment values of the color balance designated by the designation unit, and a second adjustment for adjusting the color balances of the plurality of display devices that have undergone the first adjustment, wherein resolution of the second adjustment is higher than resolution of the first adjustment.

13 Claims, 11 Drawing Sheets

FIG. 6A

| MAIN COLOR BALANCE SETTING | | SUB COLOR BALANCE SETTING | |
|---|---|---|---|
| SETTING NO. | ADJUSTMENT VALUE | COORDINATES | ADJUSTMENT VALUE |
| 1 | A | (0,0) | A |
| 2 | B | (0,0) | B |
| 3 | C | (0,0) | C |
| 4 | D | (0,0) | D |

FIG. 6B

| MAIN COLOR BALANCE SETTING | | SUB COLOR BALANCE SETTING | |
|---|---|---|---|
| SETTING NO. | ADJUSTMENT VALUE | COORDINATES | ADJUSTMENT VALUE |
| 1 | A | (●,▲) | W |
| 2 | B | (0,0) | B |
| 3 | C | (■,★) | Y |
| 4 | D | (★,●) | Z |

ELECTRONIC DEVICE AND CONTROL METHOD THEREOF

BACKGROUND OF THE INVENTION

Field of the Invention

The present invention relates to an electronic device having a plurality of display devices and a control method thereof, and more particularly to a technique relating to a color balance adjustment between the plurality of display devices.

Description of the Related Art

Recently, with the progress of digitalization of cameras, the replacement of optical viewfinders with electronic viewfinders is progressing. Accordingly, a plurality of display devices, such as a rear monitor and an electronic viewfinder, are often provided on one camera. However, the color balances of display devices differ depending on the characteristics of each display device. As a result, there is a problem that the color balances of the rear monitor and the electronic viewfinder differ, which may be unpleasant to the user. In order to match the color balance of the electronic viewfinder with the color balance of the rear monitor, a function of adjusting the color balances with high resolution (for example, every color temperature of about 100K) is required.

There is also a need for matching the color balance of a rear monitor of a camera with the color balance of an external display monitor used for a PC or the like used by a user. There are various color balance settings for external display monitors used in PCs, etc., such as printing industry standards and Japanese broadcasting standards. Therefore, in order to match the color balances of a rear monitor and an electronic viewfinder of a camera with each standard of an external monitor, it is necessary for the camera to have a wide setting range (for example, a color temperature of about 5000K to about 9300K).

In order to satisfy the above two requirements, each display device needs a color balance adjustment function having high resolution and a wide setting range, but in that case, the number of points of color balance adjustment that can be set by the user becomes large, which causes a problem that the setting operation becomes complicated.

In order to solve the above problem, for example, Japanese Patent Laid-Open No. 04-166988 discloses a method capable of collectively or individually adjusting the image qualities of a plurality of display devices.

However, in the prior art disclosed in Japanese Patent Laid-Open No. 04-166988, the image qualities of a plurality of monitors can be adjusted individually after the image qualities are adjusted collectively, but the resolution in the individual adjustment is the same as the resolution in the collective adjustment, and thus fine adjustment is difficult.

SUMMARY OF THE INVENTION

The present invention has been made in consideration of the above situation and, in an electronic device having a plurality of display devices, reduces the complexity of color balance adjustment setting for the plurality of display devices.

According to the present invention, provided is an electronic device comprising: a plurality of display devices; a designation unit that designates one of a plurality of predetermined color balances for which adjustment values of the plurality of display devices are set in advance; and an adjustment unit that adjusts color balances of the plurality of display devices, wherein the adjustment unit performs a first adjustment for adjusting the color balances of the plurality of display devices using adjustment values of the color balance designated by the designation unit, and a second adjustment for adjusting the color balances of the plurality of display devices that have undergone the first adjustment, and wherein resolution of the second adjustment is higher than resolution of the first adjustment, and wherein each unit is implemented by one or more processors, circuitry or a combination thereof.

Further, according to the present invention, provided is a control method of an electronic device having a plurality of display devices, comprising: designating one of a plurality of predetermined color balances for which adjustment values of the plurality of display devices are set in advance; adjusting the color balances of the plurality of display devices using adjustment values of the designated color balance; and adjusting the color balances of the plurality of display devices that have undergone the first adjustment, wherein resolution of the second adjustment is higher than resolution of the first adjustment.

Furthermore, according to the present invention, provided is a non-transitory computer-readable storage medium, the storage medium storing a program that is executable by the computer, wherein the program includes program codes for causing the computer to function as an electronic device processing apparatus, comprising: a designation unit that designates one of a plurality of predetermined color balances for which adjustment values of a plurality of display devices are set in advance; and an adjustment unit that adjusts color balances of the plurality of display devices, wherein the adjustment unit performs a first adjustment for adjusting the color balances of the plurality of display devices using adjustment values of the color balance designated by the designation unit, and a second adjustment for adjusting the color balances of the plurality of display devices that have undergone the first adjustment, and wherein resolution of the second adjustment is higher than resolution of the first adjustment.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 6A and 6B are diagrams showing examples of tables showing adjustment values of the sub color balance setting according to the first embodiment;

DESCRIPTION OF THE EMBODIMENTS

Figure 1A:
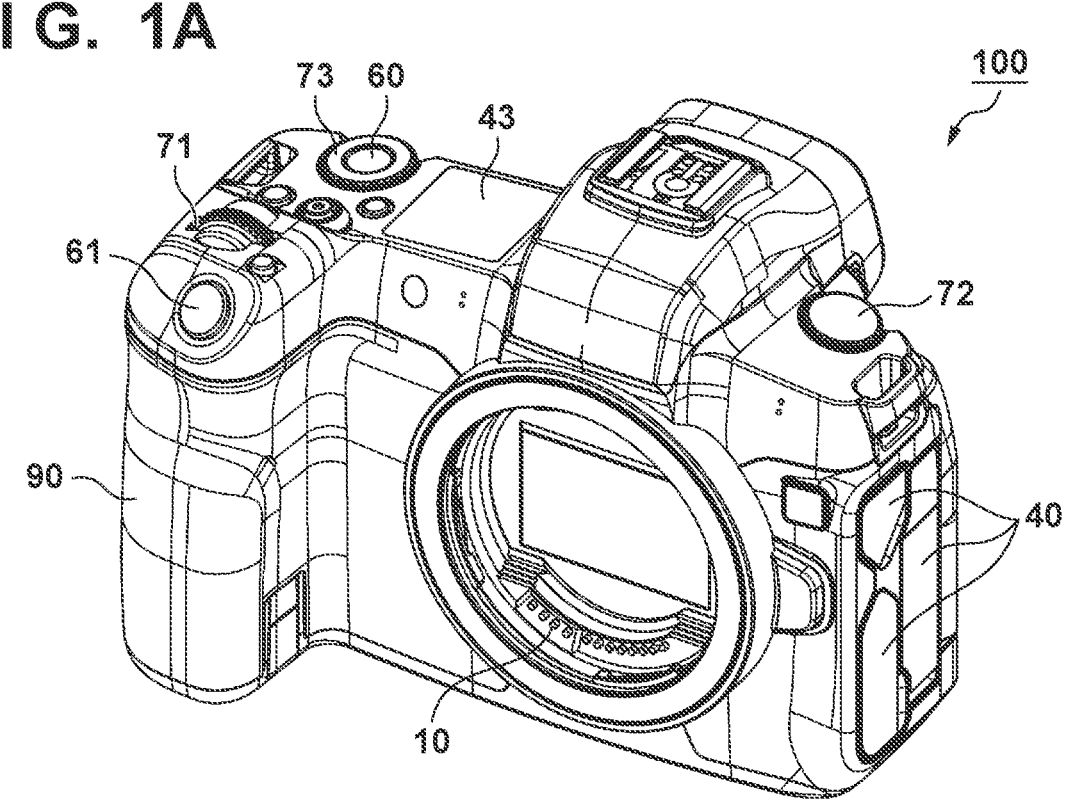
FIGS. 1A and 1B are external views of an image capturing apparatus according to an embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 1B:
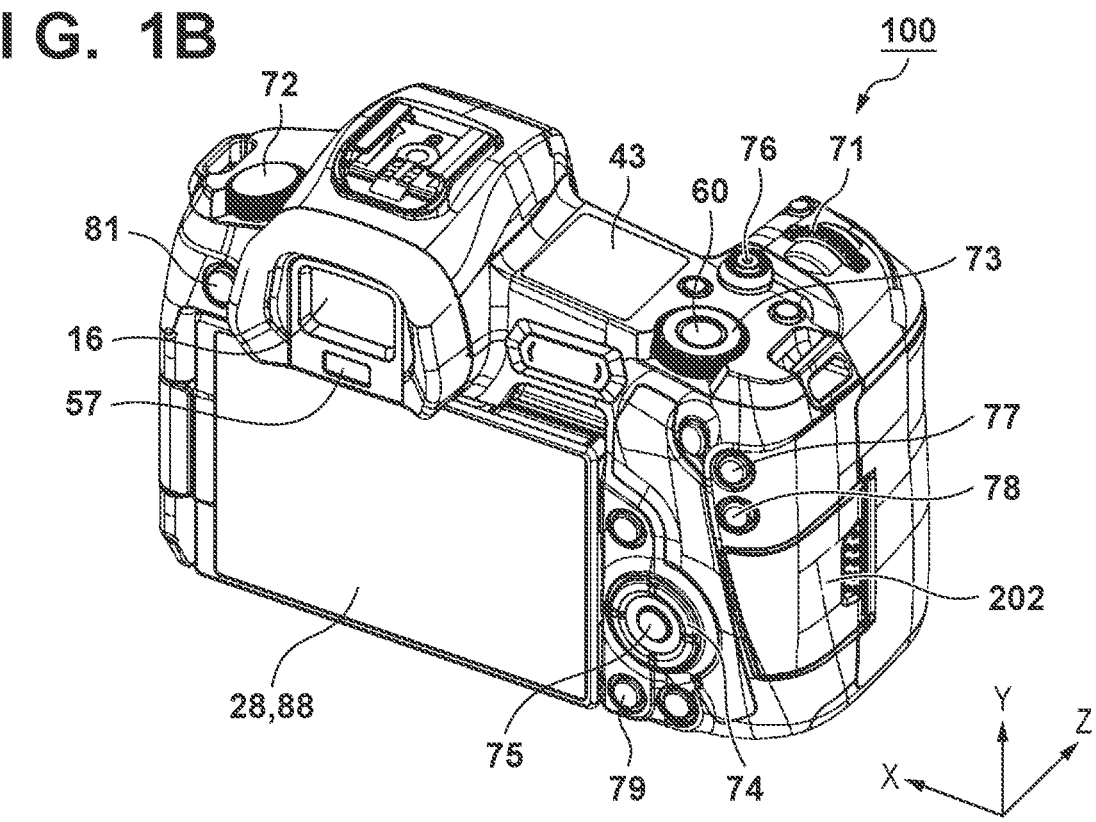

FIGS. 1A and 1B show external views of an image capturing apparatus 100 as an example of an electronic device to which the present invention can be applied.

FIG. 1A is a front perspective view of the image capturing apparatus 100, and FIG. 1B is a rear perspective view of the image capturing apparatus 100.

A display 28 is provided on the back surface of the camera and displays an image and various information. A touch panel 88 can detect a touch operation on the display surface (operation surface) of the display 28. A secondary display 43 is provided outside of a finder on the upper surface of the camera, and various setting values of the camera such as a shutter speed and an aperture value are displayed.

Further, examples of operating members for instructing to the image capturing apparatus 100 by the user include a shutter button 61 for giving a shooting instruction, a mode changeover switch 60 for switching between various modes, and a power switch 72 for switching between power on/off of the image capturing apparatus 100. Further, the operating members include a main electronic dial 71 and a sub electronic dial 73, which are rotation operating members. The main electronic dial 71 is turned to change setting values of shutter speed and the aperture, for example, and the sub electronic dial 73 is turned to move a selection frame and feed images, for example.

Further, a cross key 74 is a four-direction key whose upper, lower, left and right portions can be pushed, and an operation corresponding to the pressed portion is performed. A SET button 75 is a push button and is mainly used for determining a selection item or the like.

A moving image button 76 is a push button used to instruct the start and stop of moving image shooting (recording). An AE lock button 77 is a push button, and the exposure state is fixed by pressing the AE lock button 77 in a shooting standby state. An enlargement button 78 is a push button for turning on/off an enlargement mode in a live view display in a shooting mode. By operating the main electronic dial 71 after turning on the enlargement mode, a live view image can be enlarged or reduced. In a playback mode, the enlargement button 78 functions to enlarge a reproduced image and increase an enlargement ratio.

A play button 79 is a push button for switching between the shooting mode and the playback mode. By pressing the play button 79 during the shooting mode, it is possible to shift from the shooting mode to the playback mode, and to display the latest image among images recorded on a recording medium 200 described later on the display 28.

A menu button 81 is a push button, and by pressing the menu button 81, various settable menu screens are displayed on the display 28. The user can intuitively make various settings using the menu screen displayed on the display 28 and the cross key 74 and SET button 75.

A communication terminal 10 is for the image capturing apparatus 100 to communicate with a detachable lens unit 150 described later when the lens unit 150 is attached.

An eyepiece 16 is of an eyepiece finder (a peep-type finder), and the user can visually recognize an image displayed on an EVF 29, described later, configured in the finder through the eyepiece 16. A contact detection unit 57 detects whether or not a photographer is in contact with the eyepiece 16.

A lid 202 is of a slot for storing the recording medium 200. A terminal cover 40 is for protecting a connector (not shown) for connecting a connection cable to connect between an external device and the image capturing apparatus 100.

A grip portion 90 has a structure that allows the image capturing apparatus 100 to be held in a stable state when the user holds the image capturing apparatus 100, and has an easy-to-grip shape. In the examples shown in FIGS. 1A and 1B, the shutter button 61 and the main electronic dial 71 are arranged at positions that can be operated by the index finger of the right hand when the image capturing apparatus 100 is held by gripping the grip portion 90 with the little finger, ring finger, and middle finger of the right hand. The sub electronic dial 73 is arranged at a position where it can be operated with the thumb of the right hand in the same grip state.

Figure 2:
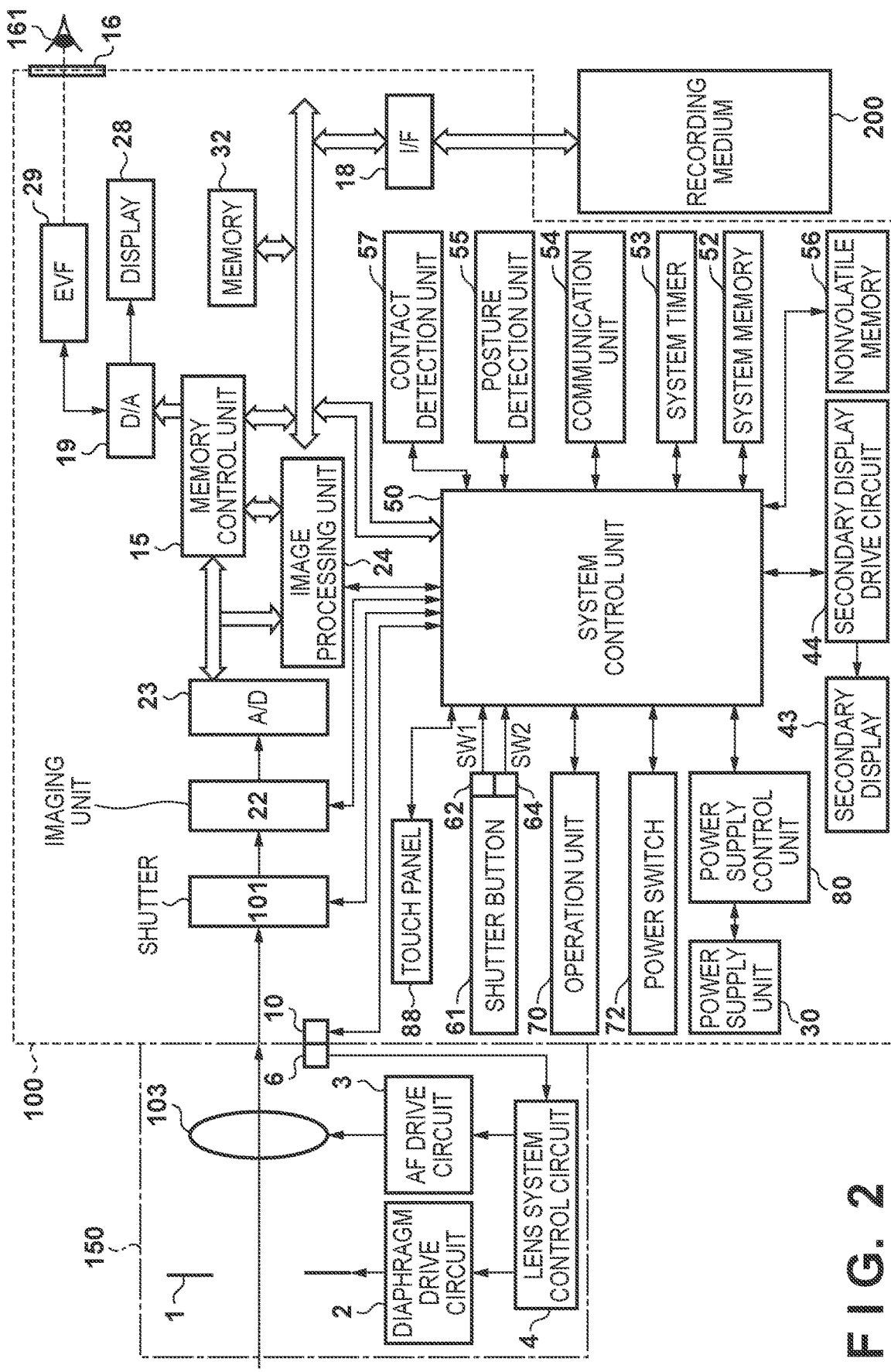
FIG. 2 is a block diagram showing a functional configuration example of an image capturing system according to the embodiment.

FIG. 2 is a block diagram showing a functional configuration example of the image capturing system according to the present embodiment, and the image capturing system is mainly comprised of the image capturing apparatus 100 shown in FIGS. 1A and 1B and the lens unit 150, which is removable from the image capturing apparatus 100, including an imaging lens 103. The imaging lens 103 is usually composed of a plurality of lenses, but here, it is represented by one lens for the sake of simplification of the figure. A communication terminal 6 is for the lens unit 150 to communicate with the image capturing apparatus 100. The lens unit 150 communicates with a system control unit 50 via the communication terminal 6 and the communication terminal 10 of the image capturing apparatus 100, and controls a diaphragm 1 via a diaphragm drive circuit 2 by a lens system control circuit 4 provided inside. Further, focus adjustment is performed by shifting the position of a focus lens included in the imaging lens 103 via an AF drive circuit 3.

A shutter 101 is a focal plane shutter that can freely control an exposure period of an imaging unit 22 under the control of the system control unit 50. The imaging unit 22 is an image sensor composed of a CCD, a CMOS element, or the like that converts an optical image that has passed through the lens unit 150 into an electric signal. An A/D converter 23 converts the analog signal output from the imaging unit 22 into a digital signal.

An image processing unit 24 performs resizing processing such as predetermined pixel interpolation and reduction and color conversion processing on the data from the A/D converter 23 or the data from a memory control unit 15 described later. Further, the image processing unit 24 performs a predetermined arithmetic process using the image data output from the A/D converter 23. Then, the system control unit 50 performs exposure control and focus adjustment control based on the obtained calculation result. As a result, through-the-lens (TTL) autofocus (AF) processing, automatic exposure (AE) processing, and pre-flash (EF) processing are performed. Further, the image processing unit 24 performs a predetermined arithmetic process using the image data output from the A/D converter 23, and performs a TTL auto white balance (AWB) processing based on the obtained calculation result.

The memory control unit 15 controls data transmission/reception between the A/D converter 23, the image processing unit 24, and a memory 32. The image data output from the A/D converter 23 is written to the memory 32 via the image processing unit 24 and the memory control unit 15 or directly via the memory control unit 15.

The memory 32 stores the image data obtained by the imaging unit 22 and converted into digital data by the A/D converter 23, and the image data to be displayed on the display 28 and the EVF 29. The memory 32 has a sufficient storage capacity for storing a predetermined number of still images, a moving image for a predetermined period, and audio. In addition, the memory 32 is also used as a memory (video memory) for displaying images. The image data for display written in the memory 32 is displayed on the display 28 or the EVF 29 via the memory control unit 15.

The display 28 and the EVF 29 display an image on a display such as an LCD or an organic EL display according to the signal from the memory control unit 15. By converting the image data that has been A/D-converted by the A/D converter 23 and stored in the memory 32 into an analog image signal by a D/A converter 19, and sequentially transferring and displaying the analog image signal to the display 28 or the EVF 29, live view display (LV display) is performed. Hereinafter, the image displayed in the live view is referred to as a live view image. Further, as described above, the touch panel 88 is formed on the display 28, and the same operation as that of an operation unit 70 can be performed by touching the display screen.

The contact detection unit 57 is a sensor that detects the approach (contact) and receding (separation) of an eye (object) 161 to/from the eyepiece 16 of the finder. The system control unit 50 switches between display/non-display of the display 28 and the EVF 29 according to the state detected by the contact detection unit 57. More specifically, at least in the shooting standby state and when changeover between the displays is automatically performed, the display 28 is selected during the separate state, and the display 28 is used for display, whereas the EVF 29 is not. On the other hand, during the contact state, the EVF 29 is used for display, whereas the display 28 is not.

For example, an infrared proximity sensor can be used as the contact detection unit 57, and is capable of detecting the approach of some object to the eyepiece 16 of the finder containing the EVF 29. When an object approaches, the infrared rays emitted by a light emitting part (not shown) of the contact detection unit 57 are reflected by the object and received by a light receiving part (not shown) of an infrared proximity sensor. In addition, it is possible to determine how close the object is from the eyepiece 16 based on the amount of infrared rays received.

When an object approaching the eyepiece 16 within a predetermined distance from the separate state (distant state) is detected, it is assumed that the contact state is detected. Further, in a case where the object that has detected as being close to the eyepiece 16 is receding from the eyepiece 16 by a predetermined distance or more from the contact state (close state), it is assumed that the separate state is detected. The threshold value for detecting the contact state and the threshold value for detecting the separate state may be different, for example, by providing hysteresis. In addition, after the contract state is detected, it is assumed that the contact state is maintained until the separate state is detected. Further, after the separate state is detected, it is assumed that separate state is maintained until the contact state is detected.

The infrared proximity sensor is an example, and another sensor may be used for the contact detection unit 57 as long as it can detect the approach of an eye or an object that can be regarded as the contact state.

On the secondary display 43, various setting values of the camera such as the shutter speed and the aperture value are displayed via a secondary display drive circuit 44.

A nonvolatile memory 56 is a memory that can be electrically erased and recorded, and as the nonvolatile memory 56, a Flash ROM, for example, may be used. The non-volatile memory 56 stores constants, programs, and the like for the operation of the system control unit 50. The programs stored in the nonvolatile memory 56 includes a program for executing various flowcharts described later.

The system control unit 50 is a control unit consisting of at least one processor or circuit, and controls the entire image capturing apparatus 100. By executing the programs recorded in the nonvolatile memory 56, each process described later is realized. RAM is used as a system memory 52, for example, where constants and variables for the operation of the system control unit 50, a program read out from the nonvolatile memory 56, and the like are loaded. The system control unit 50 also controls the display by controlling the memory 32, the display 28, etc. A system timer 53 is a time measuring unit that measures the time used for various controls and the time of the built-in clock.

The operation unit 70 is operation means for inputting various operation instructions to the system control unit 50. The operation unit 70 includes the mode changeover switch 60, the main electronic dial 71, the sub electronic dial 73, the cross key 74, the SET button 75, the moving image button 76, the AE lock button 77, the enlargement button 78, the play button 79, the menu button 81 which are shown in FIGS. 1A and 1B. The operation by each operating member is as described above with reference to FIGS. 1A and 1B.

Further, the operation unit 70 includes various button switches and dials in addition to the above-mentioned operation members. By operating them, shooting mode, continuous shooting mode, set, macro, page feed, flash setting, menu change, white balance selection, shooting image quality selection, exposure compensation, date/time setting, shutter speed, aperture value, exposure, etc. can be set. In addition, the operation unit 70 includes a live view shooting start/stop switch, an up/down/left/right direction switch, a zoom magnification change switch for reproduced image, an image display on/off switch, a quick review on/off switch for automatically playing back shot image immediately after shooting, a switch for erasing a reproduced image, a compression mode switch for selecting each compression ratio of JPEG and MPEG compression and a CCDRAW mode for digitizing and recording the signal from the image sensor as it is, an AF mode setting switch that, when the release switch is half-pressed, sets a one-shot AF mode that keeps the in-focus state adjusted by AF or a servo AF mode that continues the AF operation, and so forth.

The power switch 72 can be set to switch between the power on and power off modes of the image capturing apparatus 100. In addition, the lens unit 150 connected to the image capturing apparatus 100, the power on and power off settings of various accessory devices such as recording media can also be switched and set.

A first shutter switch 62 is turned on during operation, that is so-called a half stroke of the shutter button 61 provided in the image capturing apparatus 100 (shooting preparation instruction), and generates a first shutter switch signal SW1. The first shutter switch signal SW1 starts shooting preparation operations such as AF processing, AE processing, AWB processing, and EF processing.

A second shutter switch 64 is turned on when the shutter button 61 is completely operated, namely by so-called a full stroke of the shutter button 61 (shooting instruction), and generates a second shutter switch signal SW2. In response to the second shutter switch signal SW2, the system control unit 50 starts a series of shooting processes from reading out the signal from the imaging unit 22 to writing the captured image in the recording medium 200 as an image file.

A power supply control unit 80 is composed of a battery detection circuit, a DC-DC converter, a switch circuit for switching blocks to be energized, and the like, and detects whether or not a battery is installed, the type of the battery, and the remaining battery level. Further, the power supply control unit 80 controls the DC-DC converter based on the detection result and an instruction from the system control unit 50, and supplies a necessary voltage to respective units including the recording medium 200 for a necessary period. A power supply unit 30 includes a primary battery such as an alkaline battery or a lithium battery, a secondary battery such as a NiCd battery, a NiMH battery and a lithium ion battery, an AC adapter, or the like.

A recording medium I/F 18 is an interface with the recording medium 200 such as a memory card or a hard disk. The recording medium 200 is a recording medium such as a memory card for recording captured images, and is composed of a semiconductor memory, a magnetic disk, or the like.

A communication unit 54 transmits and receives video signals and audio signals via wireless or a wired cable. The communication unit 54 can also be connected to a wireless Local Area Network (LAN) and the Internet. Further, the communication unit 54 can also communicate with an external device using Bluetooth (registered trademark) or Bluetooth Low Energy. The communication unit 54 can transmit an image (including a live view image) captured by the imaging unit 22 and an image recorded in the recording medium 200, and can also receive an image and various other information from an external device.

A posture detection unit 55 detects the posture of the image capturing apparatus 100 with respect to the direction of gravity. Based on the posture detected by the posture detection unit 55, it is possible to determine whether an image shot by the imaging unit 22 is an image taken by holding the image capturing apparatus 100 horizontally or an image taken by holding the image capturing apparatus 100 vertically. The system control unit 50 can control to add orientation information according to the posture detected by the posture detection unit 55 to the image file of the image captured by the imaging unit 22, or to record the image after rotating it. As the posture detection unit 55, an acceleration sensor, a gyro sensor, or the like can be used. It is also possible to detect the movement of the image capturing apparatus 100 (pan, tilt, lift, stationary, etc.) using this acceleration sensor or gyro sensor.

First Embodiment

Hereinafter, a control method for adjusting the color balances of a plurality of display devices according to the first embodiment of the present invention will be described with reference to FIGS. 3 to 6B.

Figure 3A:
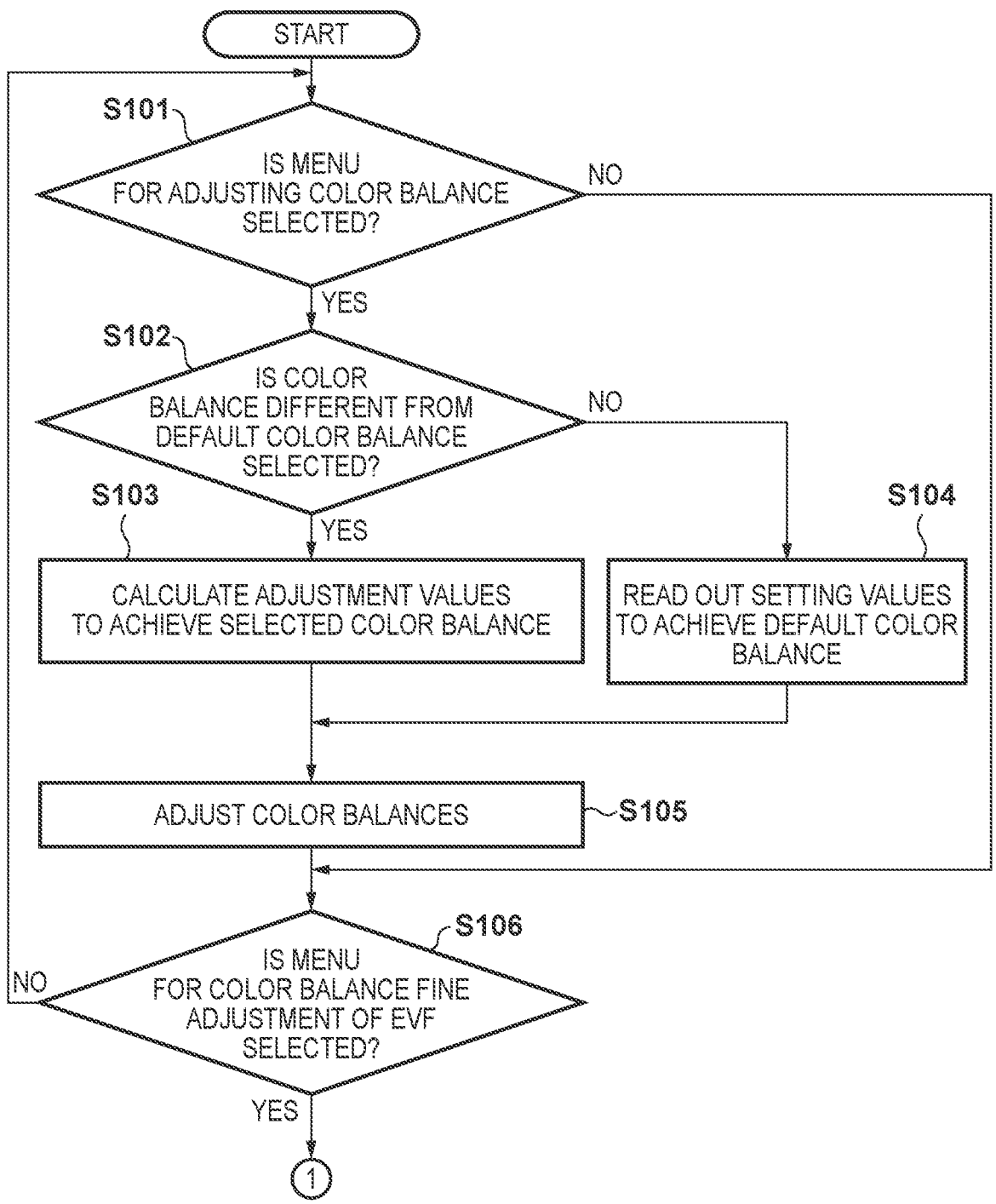
FIGS. 3A and 3B show a flowchart showing a control method for adjusting color balances of a display unit and an EVF according to a first embodiment.
Figure 3B:
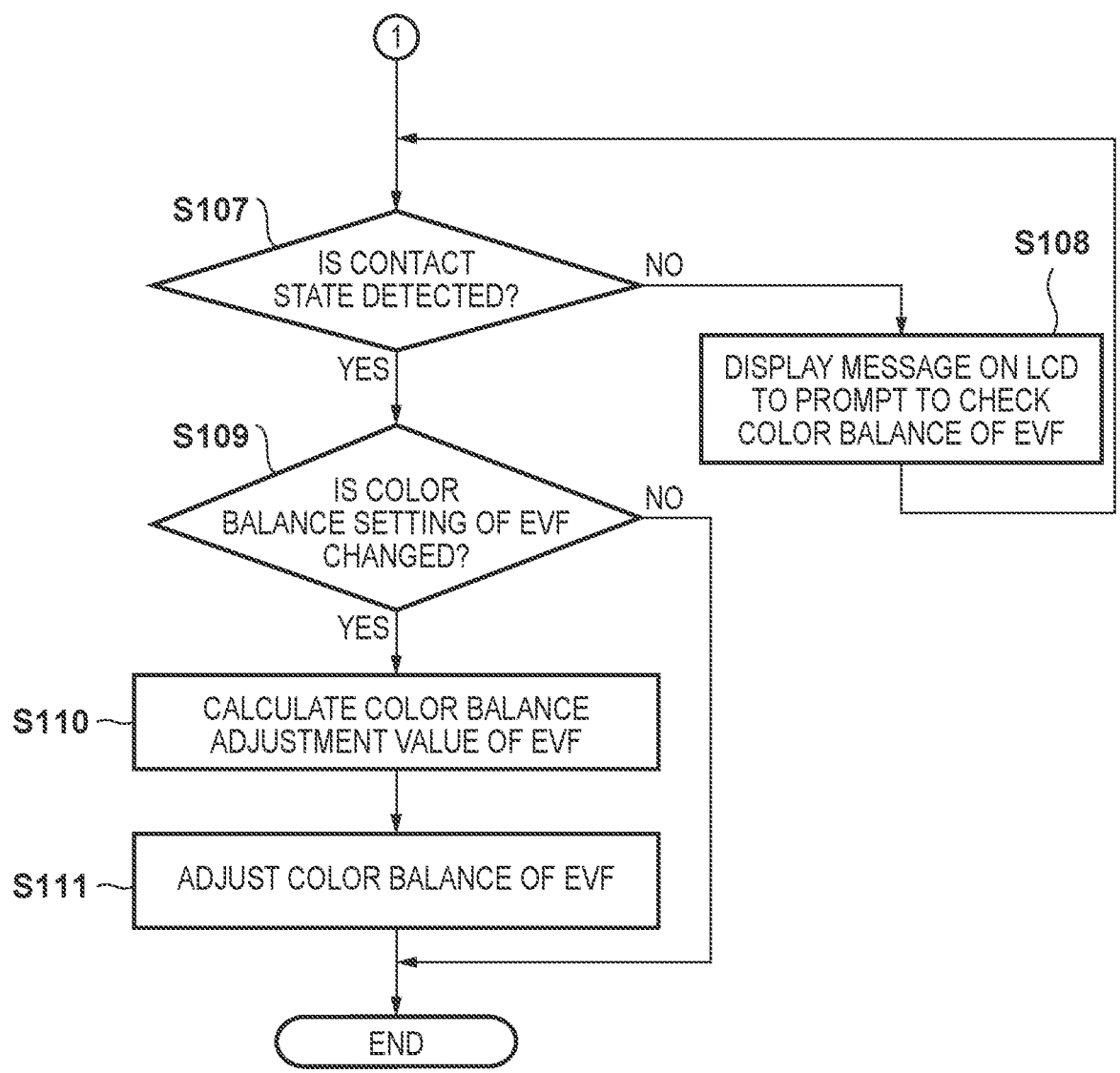

FIGS. 3A and 3B show a flowchart showing that the system control unit 50 controls to adjust the color balances of the display 28 and the EVF 29.

When the power switch 72 of the image capturing apparatus 100 is operated, the program recorded in the nonvolatile memory 56 is loaded into the system memory 52, and the system control unit 50 is activated. This flowchart starts from the point where the system control unit 50 determines that the menu button 81 has been pressed and displays a setting menu screen of the image capturing apparatus 100 on the display 28 or the EVF 29.

In step S101, the system control unit 50 determines whether or not a menu for adjusting the color balance is selected on the setting menu screen displayed on the display 28 and the EVF 29 by operating the operation unit 70. Here, the setting menu screen used for the selection at this time will be described.

Figures 4A, 4B:
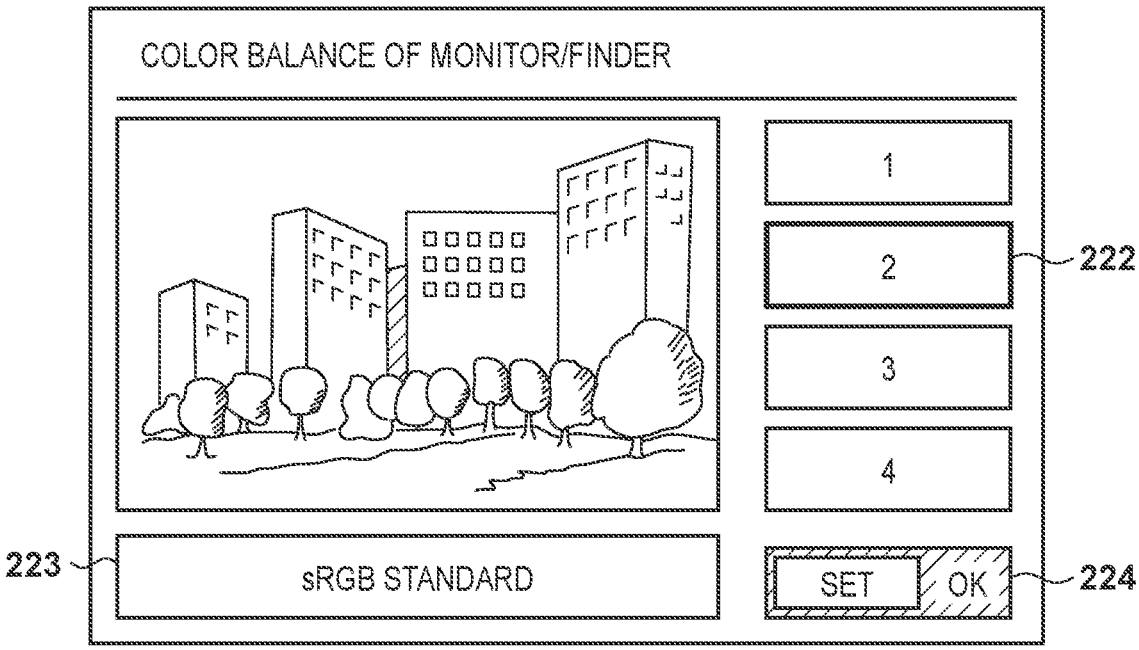
FIGS. 4A and 4B are diagrams showing examples of setting menu screens for a main color balance setting according to the first embodiment.

FIG. 4A is an example of the setting menu screen for making various settings of the image capturing apparatus 100 displayed on the display 28 or the EVF 29 when the menu button 81 is operated. When the user operates the operation unit 70 to move a selection cursor 221 and performs a decision operation, the display switches to the screen for making various corresponding settings. Here, when the user makes a decision operation with the selection cursor 221 placed on "color balance of monitor/finder", the system control unit 50 determines that the color balance adjustment has been selected. If it is determined that the color balance adjustment is selected, the process proceeds to step S102, and if not, the process proceeds to step S106.

In step S102, the system control unit 50 determines whether or not a color balance different from the default color balance is selected as the color balances of the display 28 and the EVF 29. The default color balance refers to a predetermined color balance such as a color balance set at the time of shipment from the factory of the image capturing apparatus 100, for example.

FIG. 4B shows an example of the color balance setting screen at this time. In FIG. 4B, 1 to 4 indicate the color balance numbers set in the image capturing apparatus 100. Examples of color balances include a printing industry standard color balance, Japanese broadcasting standard color balance, and sRGB standard color balance. The user can select one of these color balances by operating the operation unit 70 to place a selection cursor 222 on any of the various settings displayed as 1 to 4 and operating a set button 224. By setting a plurality of color balances in advance as options shown by 1 to 4 in this way, the user can easily select a desired color balance. The color balance options are not limited to four, and are not limited to the above-mentioned types of color balances.

Further, in a box 223, the type of color balance currently selected by the selection cursor 222 is displayed. Here, a case where "sRGB standard" is set to "2" selected by the selection cursor 222 is shown. The set color balance name may be displayed instead of the numbers 1 to 4. In that case, the box 223 may be omitted, or the color balance name currently set in the image capturing apparatus 100 may be displayed.

As the default color balance, any color balance can be set from the color balances set to 1 to 4, and here, "sRGB standard" is used as an example.

In step S102, in a case where it is determined that the selection cursor 222 has selected a color balance different from the default color balance when the set button 224 is operated (for example, in a case where any one of "1", "3", and "4" is selected), the process proceeds to step S103. On the other hand, in a case where it is determined that the default color balance is selected (for example, in a case where "2" is selected), the process proceeds to step S104.

In steps S103 and S104, color balance adjustment values are obtained, and the color balance adjustment of the display 28 and the EVF 29 is performed in conjunction with each other in steps S103 and S104. The purpose of calculating the color balance adjustment values is, for example, to bring the color balance closer to that of an external display monitor, such as the printing industry standard color balance and the Japanese broadcasting standard color balance. Therefore, a color balance adjustment range (for example, the color temperature is about 5000K to 9000K) that can be set is wider than an adjustment range that can be set in fine adjustment described later, and the resolution is low. Further, as the purpose of steps S103 and S104 is to bring the color balance closer to that of an external display monitor as described above, the number of settings that can be selected is small (4 types in the example shown in FIG. 4B). As a result, the user can select a desired color balance without feeling complicated. Hereinafter, the color balance setting performed in conjunction between the display 28 and the EVF 29, which is performed in step S103 or S104, is referred to as "main color balance setting".

In step S103, the system control unit 50 calculates the adjustment values so as to achieve the color balance selected in step S102. At this time, the initial values indicating the default color balance setting are stored in advance in the nonvolatile memory 56 respectively for the display 28 and the EVF 29. In step S103, these initial values are read out, and the adjustment values with respect to the initial values are calculated for each of the display 28 and the EVF 29.

In step S104, the initial values indicating the default color balance setting values of the display 28 and the EVF 29, which are recorded in the nonvolatile memory 56 in advance, are read out. The adjustment values are not calculated here.

In step S105, the color balances of the display 28 and the EVF 29 are adjusted by using the initial values obtained in step S103 or S104 and the adjustment values if calculated. Specifically, settings are made to apply the initial values and the adjustment values to the image data so that the color balance is adjusted when the image data is displayed. The system control unit 50 stores the adjustment values at this time in the nonvolatile memory 56 separately from the initial values. As a result, even when the power switch 72 is operated to enter the power-off state and then the image capturing apparatus 100 is restarted, by reading out the adjustment values, it is possible to adjust the color balances of the display 28 and the EVF 29 to become the color balance selected in step S102.

In step S106, the system control unit 50 determines whether or not the operation unit 70 is operated and a menu for fine adjustment of the color balance of the EVF 29 is selected on the setting menu screens displayed on the display 28 and the EVF 29. A setting menu display screen used for the selection at this time is shown in FIG. 5A.

Figure 5A:
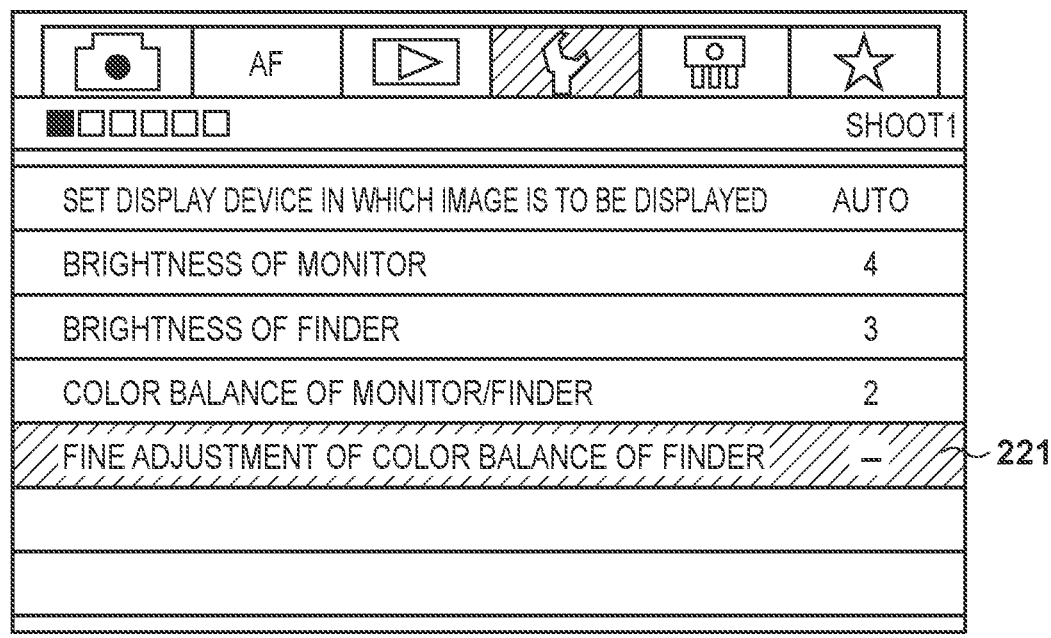
FIGS. 5A to 5C are diagrams showing examples of setting screens for a sub color balance setting according to the first embodiment.

FIG. 5A is an example of a setting menu screen for making various settings of the image capturing apparatus 100 displayed on the display 28 or the EVF 29 when the menu button 81 is operated. When the user operates the operation unit 70 to move the selection cursor 221 and performs a decision operation, the display switches to the screen for making corresponding setting. Here, if the user makes a decision operation with the selection cursor 221 placed on the "fine adjustment of color balance of finder", the system control unit 50 determines that the color balance fine adjustment has been selected and the process proceeds to step S107. If not, the process returns to step S101.

The color balance fine adjustment performed in the following processing aims to bring the color balance of the EVF 29 of the image capturing apparatus 100 closer to the color balance of the display 28. In the color balance fine adjustment, since the difference in color balance between the EVF 29 and the display 28 is smaller than that at the time of the main color balance setting, the color balance adjustment range that can be set is made narrower than that in the main color balance setting, and the setting resolution is sufficiently high (for example, about 100K as a resolution step at the color temperature).

In step S107, the system control unit 50 receives a notification from the contact detection unit 57 and determines whether or not the contact state is detected. If the contract state is detected, the process proceeds to step S109, and if the contact state is not detected, the process proceeds to step S108.

In step S108, the system control unit 50 displays a comment on the display 28 prompting the user to look into the EVF 29 and check the color balance, and the process returns to step S107.

Figure 5B:
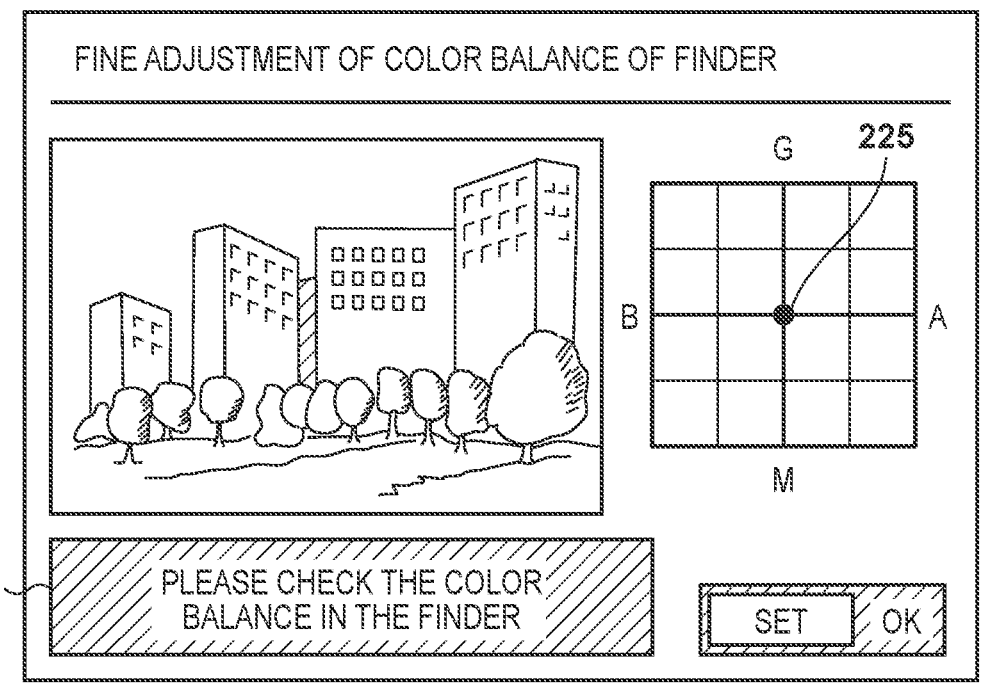

FIG. 5B shows an example of the color balance fine adjustment screen for the EVF 29 displayed on the display 28 in step S108. The effect of fine adjustment of the color balance of the EVF 29 needs to be checked by the user by looking into the EVF 29. Therefore, the display 28 displays a comment 226, which encourages the user to look into the EVF 29 to make fine adjustment. At this time, it may be or may not be configured such that the color balance setting of the EVF 29 can be performed on the display 28.

Figure 5C:
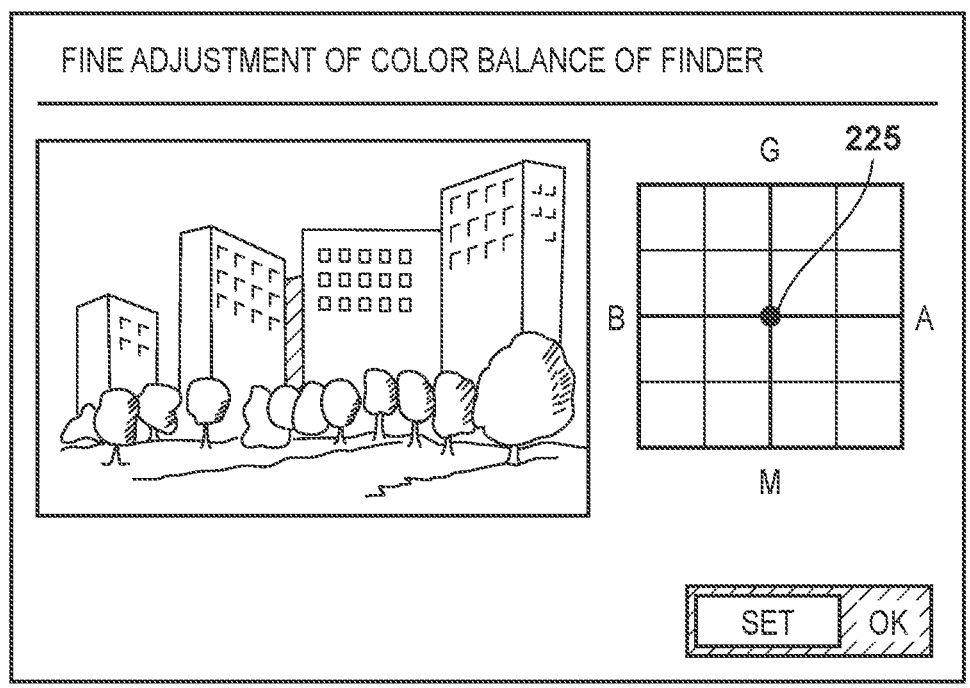

FIG. 5C is an example of a setting screen of the color balance fine adjustment of the EVF 29 displayed in step S110. For the color balance fine adjustment of the EVF 29, for example, a setting screen that can adjust the color balance in the two axes of green (G)-magenta (M) and blue (B)-amber (A) is displayed. The color balance of the EVF 29 can be finely adjusted by moving a cursor 225 to each coordinate of the matrix. In this way, by making the setting possible in the two-dimensional matrix coordinates, a user can intuitively select a setting that is difficult with the one-dimensional coordinates, such as an intermediate color between blue and green. At this time, the adjustment value of the main color balance setting set in step S105 is set as the center coordinates of the two-dimensional matrix coordinates. Further, since the adjustment value of each coordinate can be selected, the resolution is sufficiently high and the number of selectable adjustment settings is large comparing to the number of adjustment settings that can be selected in the main color balance setting. This allows the user to finely adjust the adjustment value set in the main color balance setting.

In step S109, the system control unit 50 determines whether or not the user has changed the color balance setting of the EVF 29 on the color balance fine adjustment screen for the EVF 29 as shown in FIG. 5C. If the system control unit 50 determines that the user has not changed the color balance setting, the color balance of the EVF 29 has already been finely adjusted and the process ends. Otherwise, that is, if the user changes the color balance setting by moving the cursor 225, the process proceeds to step S110.

In step S110, color balance fine adjustment value of the EVF 29 is selected based on the coordinates of the position of the cursor 225, and the system control unit 50 calculates an adjustment value of color balance setting of the EVF 29 so that the selected color balance is achieved.

In the present embodiment, after changing the main color balance setting, the coordinates of the position of the cursor 225 are set at the center coordinates (default) of the two-dimensional matrix coordinates, but the present invention is not limited to this. That is, the coordinates of the position of the cursor 225 before changing the main color balance setting are stored in the nonvolatile memory 56, and at the time of changing the main color balance setting, the adjustment value may be calculated based on the stored coordinates of the position of the cursor 225.

In step S111, the system control unit 50 adjusts the color balance setting of the EVF 29 using the adjustment value calculated in step S110. At this time, the system control unit 50 performs the adjustment calculation based on the adjustment value at the time of the main color balance setting. In this way, it is possible to finely adjust the color balance of the EVF 29 set in the main color balance setting to match the color balance of the display 28. The adjustment value at this time is stored in nonvolatile memory 56 separately from the initial values. As a result, even when the power switch 72 is operated to enter the power-off state and then the image capturing apparatus 100 is restarted, by reading out the adjustment value, it is possible to set the EVF 29 to the finely adjusted color balance with respect to the color balance selected in step S102.

Hereafter, the fine adjustment of the EVF 29 to match the color balance of display 28 is called "sub color balance setting".

FIGS. 6A and 6B are diagrams showing the contents of the adjustment values in the main color balance setting and the sub color balance setting of the EVF 29 stored in the nonvolatile memory 56 in step S111.

FIG. 6A shows the coordinates of adjustment values and the adjustment values of the EVF 29 in the state after the main color balance setting is executed and before the sub color balance setting is executed. In FIG. 6A, "setting No." corresponds to the options 1 to 4 of the main color balance setting shown in FIG. 4B, and "adjustment value" indicates an adjustment value corresponding to each color balance calculated in step S103 or the adjustment value of the default color balance. The coordinates of the sub color balance setting indicate the coordinates of the two-dimensional matrix coordinates shown in FIGS. 5B and 5C. Here, regardless of the adjustment values in the main color balance setting, in the initial state, the coordinates of the adjustment values of the EVF 29 at the time of sub color balance setting are stored as the origin, and the adjustment values are the same as the adjustment values of the main color balance setting.

FIG. 6B shows the coordinates and adjustment values after executing the sub color balance setting after executing the main color balance setting. Since the sub color balance setting is not performed with respect to the setting No. 2 which corresponds to the default color balance, the same coordinates (0,0) and adjustment value B as in FIG. 6A are maintained. On the other hand, with respect to the setting Nos. other than the default color balance, namely, setting Nos. 1, 3 and 4, the coordinates and the adjustment values are updated with the coordinates set in the sub color balance setting and the adjustment values after the fine adjustment, respectively.

In this way, by storing the adjustment values by the main color balance setting, the coordinates at the time of the sub color balance setting, and the adjustment values after the fine adjustment in association with each other, it is possible to read out the associated adjustment value set in the sub color balance setting when a different color balance is selected. This allows the user to perform the color balance fine adjustment for EVF 29 only once for each color balance option, thereby eliminating the need to perform a sub color balance setting each time the main color balance is changed, and reducing a cumbersome operation.

If further fine adjustment of the EVF 29 is desired, by displaying the cursor 225 on the two-dimensional matrix shown in FIG. 5C at the coordinates after the color balance is set, fine adjustment can be performed from the current color balance.

As described above, by setting the color balances of the display 28 and the EVF 29 in conjunction with each other in the main color balance setting, it is possible to easily make the color balance of the external monitor and the color balances of the display 28 and the EVF 29 of the image capturing apparatus 100 close to each other. Furthermore, by finely adjusting the difference in color balance between the display 28 and the EVF 29 by the sub color balance setting, it is possible to make the color balances of three different display devices (between display devices), namely, an external monitor, the display 28 and the EVF 29 of image capturing apparatus 100, further close to each other.

In addition, the color balances of the display 28 and the EVF 29 are roughly adjusted by the main color balance setting in conjunction with each other, and then only the color balance of the EVF 29 is finely adjusted by the sub color balance setting. As a result, the number of adjustment points can be significantly reduced and the complexity felt by the user can be reduced as compared with the control method in which the color balances of the display 28 and the EVF 29 are set separately.

In the above-mentioned example, when it is determined that the default color balance is selected in step S109, the sub color balance setting is not performed. However, in case the color balances of the display 28 and the EVF 29 deviate from the initial values due to deterioration over time, etc., it may be controlled so that the sub color balance setting is performed even when the default color balance is selected.

Further, in the above-described example, after detecting the contact state in step S107, it is determined in step S109 whether or not the default color balance is selected, but the determination in step S109 may be performed before step S107. In that case, if the default color balance is selected, the sub color balance setting is not performed, and thus the contact state detection does not have to be performed. In addition, a message indicating that the fine adjustment is not performed because the default color balance is selected may be displayed.

Second Embodiment

Next, a second embodiment of the present invention will be described.

Figure 7:
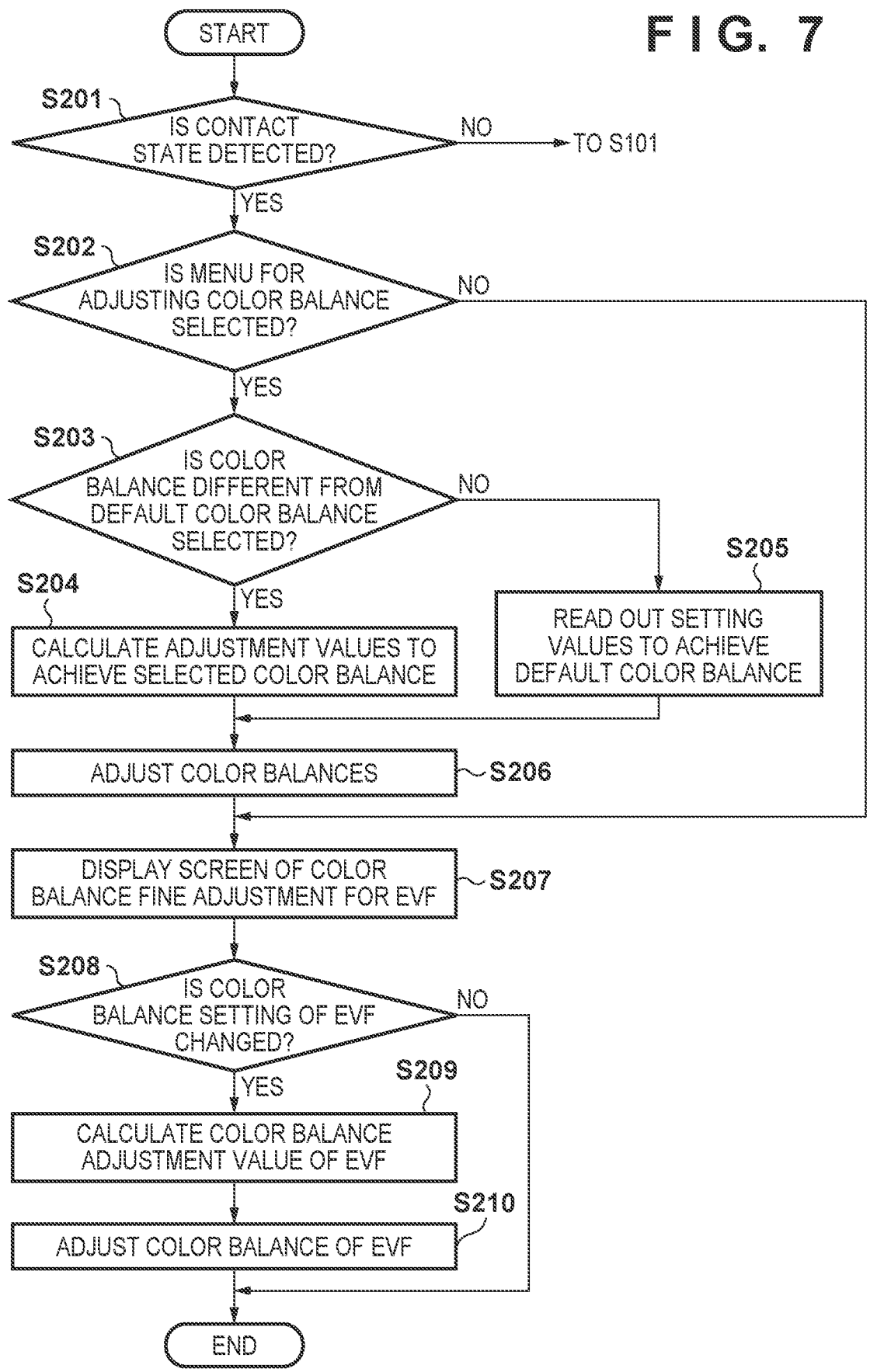
FIG. 7 is a flowchart showing a control method for adjusting color balances of a display unit and an EVF according to a second embodiment.

FIG. 7 is a flowchart showing the control in which the system control unit 50 adjusts the color balances of the display 28 and the EVF 29 in the second embodiment.

When the power switch 72 of the image capturing apparatus 100 is operated, the program recorded in the nonvolatile memory 56 is loaded into the system memory 52, and the system control unit 50 is activated. This flowchart starts from the point where the system control unit 50 determines that the menu button 81 has been pressed and displays a setting menu screen of the image capturing apparatus 100 on the display 28 or the EVF 29.

In step S201, the system control unit 50 receives a notification from the contact detection unit 57 and determines whether or not the contact state is detected. If the contact state is detected, the process proceeds to step S202, and if the contact state is not detected, the process proceeds to step S101 of FIG. 3A, and the processes described above in the first embodiment are performed.

In steps S202 to S206, since the similar processes as in steps S101 to S105 are performed except that the color balance setting screen is displayed on the EVF 29 at this time, the description thereof is omitted.

In step S207, the system control unit 50 displays a setting screen for the sub color balance setting shown in FIG. 5C described above on the EVF 29.

In steps S208 to S210, the same processes as in steps S109 to S111 are performed, and thus the description thereof will be omitted.

In the first embodiment, the user selects and executes the setting menu of the main color balance setting and the setting menu of the sub color balance setting. By contrast, according to the configuration of the second embodiment, when the user is looking into the EVF 29, the sub color balance setting can be successively performed after executing the main color balance setting. Since both settings can be performed in a series of operations, the complexity of the settings can be further reduced.

Third Embodiment

Next, a third embodiment of the present invention will be described.

Figure 8A:
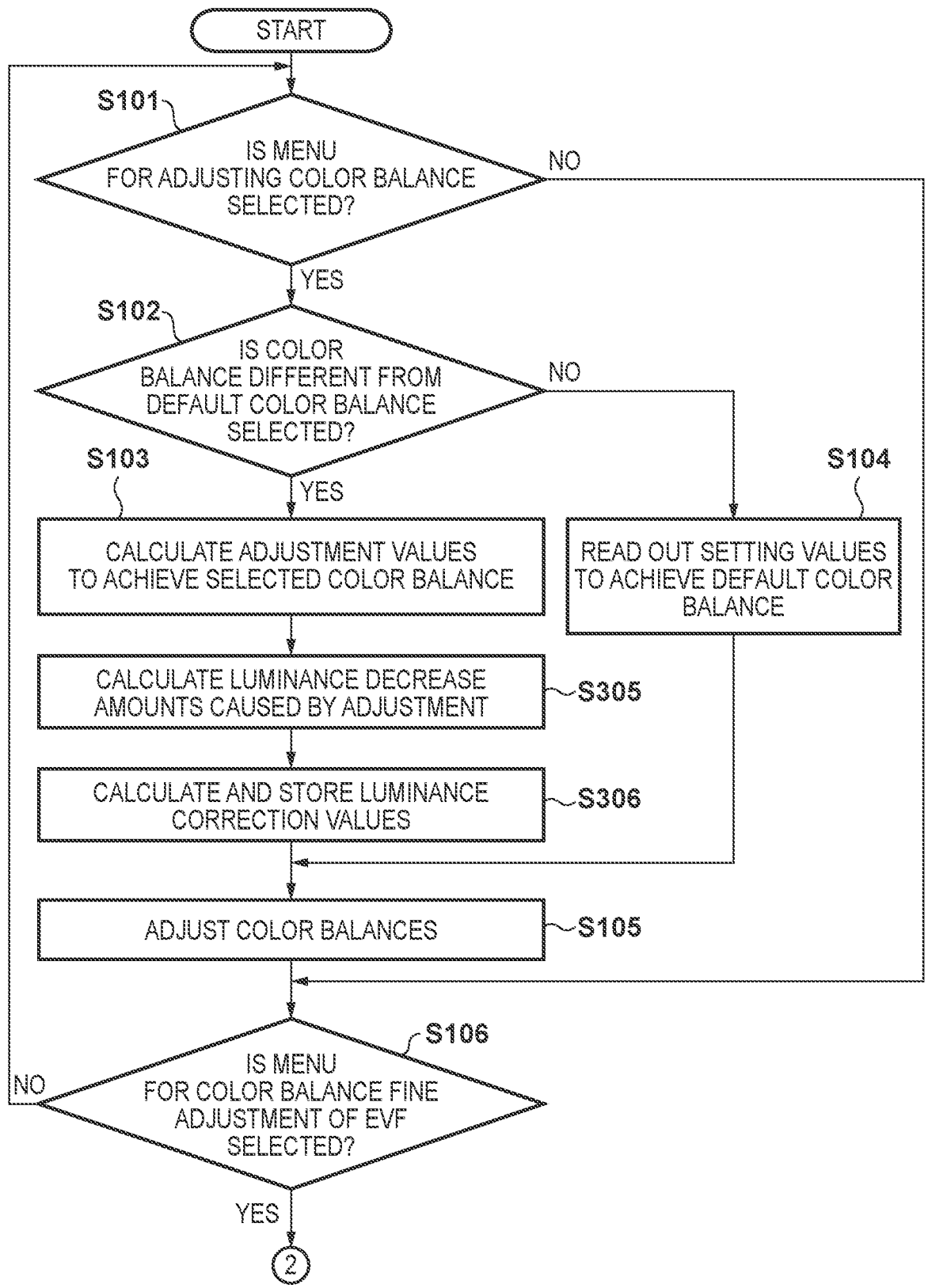
FIGS. 8A and 8B show a flowchart showing a control method for adjusting color balances of a display unit and an EVF according to a third embodiment.
Figure 8B:
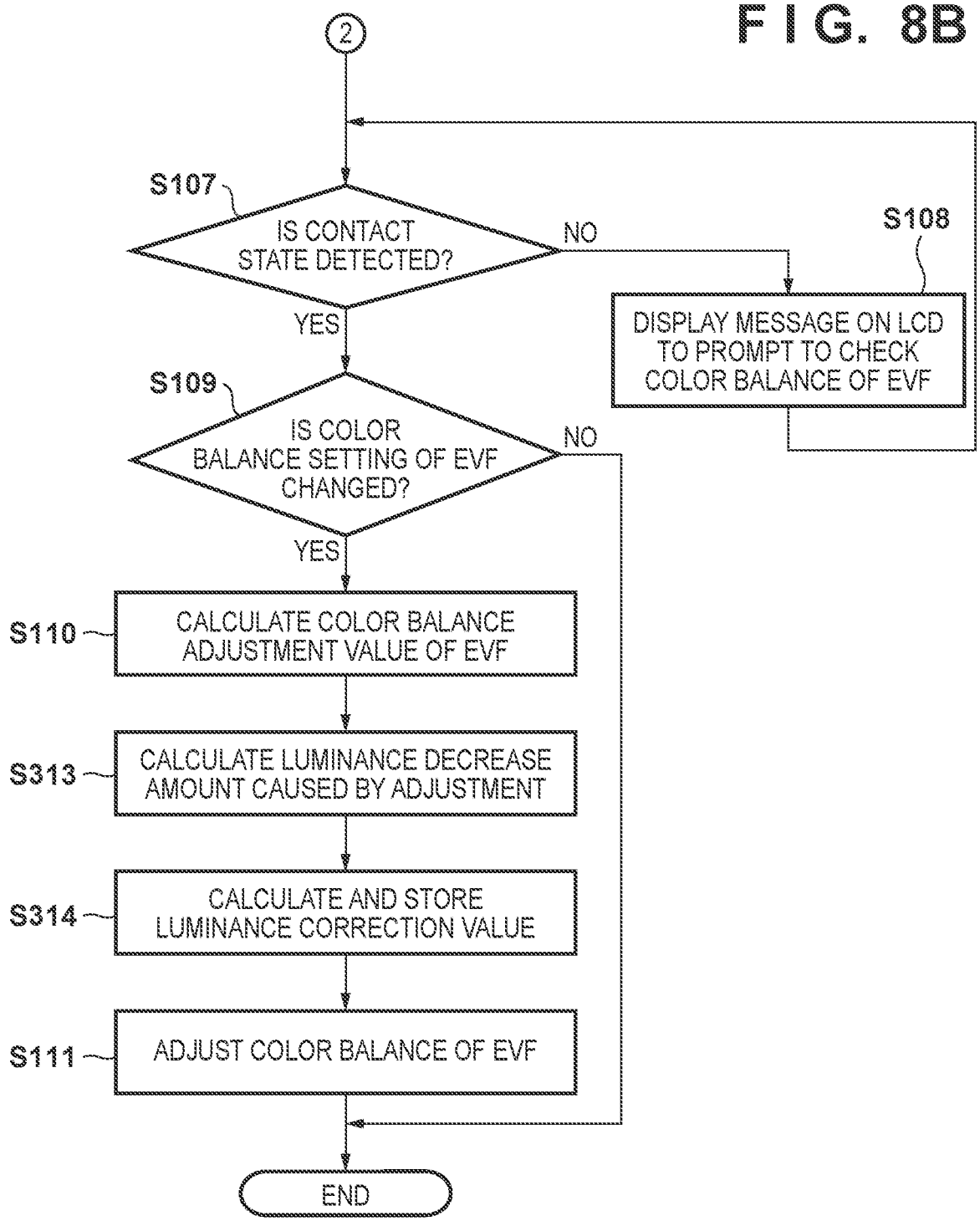

FIGS. 8A and 8B show a flowchart showing the control in which the system control unit 50 adjusts the color balances of the display 28 and the EVF 29 in the third embodiment.

When the power switch 72 of the image capturing apparatus 100 is operated, the program recorded in the nonvolatile memory 56 is loaded into the system memory 52, and the system control unit 50 is activated. This flowchart starts from the point where the system control unit 50 determines that the menu button 81 has been pressed and displays a setting menu screen of the image capturing apparatus 100 shown in FIG. 5A on the display 28 or the EVF 29. In FIGS. 8A and 8B, the same processes as those shown in FIGS. 3A and 3B are assigned the same reference numerals, and the description thereof will be omitted as appropriate.

When the initial value and the adjustment values are acquired in step S103, in step S305, the system control unit 50 calculates luminance decrease amounts indicating how much the display luminances of the display 28 and the EVF 29 are decreased based on the calculated adjustment value.

Then, in step S306, the system control unit 50 calculates luminance correction values based on the luminance decrease amounts calculated in step S305, and corrects the color balances of the display 28 and the EVF 29. Specifically, the initial values, the adjustment values, and the luminance correction values are set to be applied to image data so that the color balances are adjusted when the image data is displayed. This correction is performed because, in a case where the color balances are adjusted by applying a gain to each of the red, green, and blue signals constituting the display data, the display luminances may be lowered by adjusting the color balances. Therefore, the luminance decrease amounts caused by the color balance adjustment are calculated and corrected. For example, this means that the luminance correction values of the display 28 and the EVF 29 with respect to a light source (not shown) are set. The calculated luminance correction values are stored in the nonvolatile memory 56 in association with the adjustment values set in the main color balance setting calculated in step S103. At this time, the luminance correction values of the display 28 and the EVF 29 are stored in the nonvolatile memory 56.

Then, after calculating the adjustment value in the sub color balance setting in step S110, in step S313, the system control unit 50 calculates a luminance decrease amount indicating how much the display luminance of the EVF 29 is decreased based on the adjustment values calculated in step S110.

In step S314, the system control unit 50 calculates the luminance correction value based on the luminance drop amount calculated in step S313, and reflects the correction value in the display data for the EVF 29. The calculated luminance correction value is associated with the adjustment value set in the sub color balance setting calculated in step S110 and stored in the nonvolatile memory 56.

As described above, according to the third embodiment, by correcting the decrease in display luminances that occurs when adjusting the color balances of the display 28 and the EVF 29, the display luminances of the display 28 and the EVF 29 can be kept constant regardless of which color balance is selected.

In this embodiment, only the color balance of the EVF 29 can be finely adjusted, but instead only the color balance of the display 28 may be finely adjusted, or the color balance of each display device may be finely adjusted after the main color balance setting.

Further, the color balance adjustment method is not limited to the above-mentioned adjustment method, and a known adjustment method may be used. Further, a known adjustment method may be used for the correction method of the luminance correction in the third embodiment.

Further, in the example shown in FIG. 4B, the number of color balance selections at the time of main color balance setting is four, but the present invention is not limited to this, and any plurality of choices of color balances may be provided. Further, the adjustment range and adjustment resolution of the color balance adjustment are not limited to the above-mentioned examples.

Further, in the example shown in FIG. 5B, the setting screen for fine adjustment of the color balance of the EVF at the time of sub color balance setting is shown by using the two-dimensional matrix coordinates, but the present invention is not limited to this, and other setting screens may be used. Further, the adjustment range and adjustment resolution of the color balance adjustment in the fine adjustment may be set within a range in which the operability is not complicated and a visual change can be recognized.

Further, in the first embodiment, as shown in FIG. 5B, the message prompting a user to look into the EVF 29 to confirm the color balance of the EVF 29 is displayed on the display 28, but the notification method is not limited to this, and, for example, voice, symbols, etc. may be used.

Further, the method of calculating the adjustment values in the main color balance setting and the adjustment value in the sub color balance setting in the present embodiment may be arbitrary.

Further, in the present embodiment, the adjustment value set in the sub color balance setting is stored in the nonvolatile memory 56 with respect to the adjustment values set in the main color balance setting, but the content to be stored may be arbitrary.

In the present embodiment, the color balance of the EVF is finely adjusted once with respect to each main color balance setting. However, the coordinate shift value at the time of fine adjustment setting with respect to arbitrary one main color balance may be collectively applied to the fine adjustment setting for the remaining main color balances. In any of the main color balances, the color difference direction between the display 28 and the EVF 29 tends to be the same. Therefore, by temporarily setting the adjustment values for fine adjustments in a batch, each fine adjustment for each main color balance setting can be performed more easily. In addition, a menu may be provided to collectively reflect the adjustment value of the fine adjustment with respect to a certain main color balance setting to the adjustment values of the fine adjustments with respect to the remaining main color balance setting.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-008597, filed on Jan. 22, 2020 which is hereby incorporated by reference herein in its entirety.

What is claimed is:

1. An image capturing apparatus comprising:
a first display device provided outside of a finder;
a second display device provided inside of the finder;
a detection unit that detects a contact to the finder;
a designation unit that designates one of a plurality of predetermined color balances for which adjustment values of the plurality of display devices are set in advance; and
an adjustment unit that adjusts color balances of the first and second display devices,
wherein the adjustment unit performs
a first adjustment for adjusting the color balances of the first and second display devices using adjustment values of the color balance designated by the designation unit, and
a second adjustment for adjusting the color balances of at least one of the first and second display devices that have undergone the first adjustment,
wherein resolution of the second adjustment is higher than resolution of the first adjustment,
wherein in a case where the contact to the finder is detected by the detection unit, the choices of the plurality of predetermined color balances are displayed in the second display device, and
wherein each unit is implemented by one or more processors, circuitry or a combination thereof.

2. The image capturing apparatus according to claim 1, wherein a number of selectable adjustment settings in the second adjustment is larger than a number of selectable adjustment settings in the first adjustment.

3. The image capturing apparatus according to claim 1, wherein an adjustable adjustment range in the first adjustment is wider than an adjustable adjustment range in the second adjustment.

4. The image capturing apparatus according to claim 1 further comprising a memory that stores the adjustment values used in the first adjustment and an adjustment value used in the second adjustment in conjunction with each other.

5. The image capturing apparatus according to claim 1 further comprising a setting unit that sets an adjustment value for the second adjustment,
wherein the setting unit is implemented by one or more processors, circuitry or a combination thereof.

6. The image capturing apparatus according to claim 1, wherein an adjustment value for the second adjustment is set by designating coordinates in a two-dimensional matrix whose center coordinates correspond to the adjustment values used in the first adjustment.

7. The image capturing apparatus according to claim 6 further comprising a memory for storing the adjustment values used in the first adjustment, the adjustment value used in the second adjustment, and the designated coordinates in the two-dimensional matrix in conjunction with each other.

8. The image capturing apparatus according to claim 1 further comprising:
a calculation unit that calculates luminance correction values for correcting change in luminances that change due to the first adjustment and the second adjustment; and
a unit for adjusting luminances of the plurality of display devices using the luminance correction values,
wherein each unit is implemented by one or more processors, circuitry or a combination thereof.

9. The image capturing apparatus according to claim 8 further comprising a memory that stores the adjustment values used in the first adjustment, an adjustment value used in the second adjustment, and the luminance correction values in conjunction with each other.

10. The electronic device according to claim 1, wherein the choices of the plurality of predetermined color balances are displayed in the first display device.

11. A control method of an electronic device having first display device provided outside of a finder and a second display device provided inside of the finder, comprising:
detecting a contact to the finder;

designating one of a plurality of predetermined color balances, for which adjustment values of the plurality of display devices are set in advance;

adjusting the color balances of first and second display devices using adjustment values of the designated color balance; and adjusting the color balances of at least one of the first and second display devices that have undergone the first adjustment, wherein resolution of the second adjustment is higher than resolution of the first adjustment, and wherein in a case where the contact to the finder is detected, the choices of the plurality of predetermined color balances are displayed in the second display device.

12. A non-transitory computer-readable storage medium, the storage medium storing a program that is executable by the computer, wherein the program includes program codes for causing the computer to function as an image capturing apparatus, comprising:

a first display device provided outside of a finder;

a second display device provided inside of the finder;

a detection unit that detects a contact to the finder;

a designation unit that designates one of a plurality of predetermined color balances for which adjustment values of a plurality of display devices are set in advance; and an adjustment unit that adjusts color balances of the first and second display devices, wherein the adjustment unit performs a first adjustment for adjusting the color balances of the first and second display devices using adjustment values of the color balance designated by the designation unit, and a second adjustment for adjusting the color balances of at least one of the first and second display devices that have undergone the first adjustment, wherein resolution of the second adjustment is higher than resolution of the first adjustment, and wherein in a case where the contact to the finder is detected by the detection unit, the choices of the plurality of predetermined color balances are displayed in the second display device.

13. An image capturing apparatus comprising:

a rear monitor;

an electronic viewfinder;

a sensor that detects a contact to the electronic viewfinder; and a controller that adjusts color balances of the rear monitor and the electronic viewfinder, wherein at least one of the rear monitor and the electronic viewfinder displays choices of a plurality of color balances, wherein the controller performs a first adjustment for adjusting the color balances of the rear monitor and the electronic viewfinder based on a color balance selected by a user from the plurality of color balances, and a second adjustment for adjusting the color balance of the electronic viewfinder that have undergone the first adjustment, wherein resolution of the second adjustment is higher than resolution of the first adjustment, and wherein in a case where the contact to the electronic viewfinder is detected by the sensor, the choices of the plurality of predetermined color balances are displayed in the electronic viewfinder.

* * * * *